United States Patent
Villagrasa et al.

(10) Patent No.: US 9,032,769 B2
(45) Date of Patent: May 19, 2015

(54) ANTITHEFT DEVICE FOR THE STEERING COLUMN OF A VEHICLE HAVING SUPER-LOCKOUT PROVIDED BY A ROCKER ARM

(75) Inventors: Victor Villagrasa, Creteil (FR); Donatien Frot, Creteil (FR); Christophe Perrin, Créteil Cedex (FR); Guillaume Lesueur, Creteil (FR)

(73) Assignee: VALEO SECURITE HABITACLE, Créteil Cedex (FR)

( * ) Notice: Subject to any disclaimer, the term of this patent is extended or adjusted under 35 U.S.C. 154(b) by 346 days.

(21) Appl. No.: 13/503,894

(22) PCT Filed: Oct. 28, 2010

(86) PCT No.: PCT/EP2010/066410
§ 371 (c)(1),
(2), (4) Date: Nov. 9, 2012

(87) PCT Pub. No.: WO2011/054742
PCT Pub. Date: May 12, 2011

(65) Prior Publication Data
US 2013/0047685 A1   Feb. 28, 2013

(30) Foreign Application Priority Data

Nov. 5, 2009   (FR) ...................... 09 05311

(51) Int. Cl.
*B60R 25/02*   (2013.01)
*B60R 25/021*   (2013.01)

(52) U.S. Cl.
CPC ................. *B60R 25/0211* (2013.01)

(58) Field of Classification Search
CPC .................. B60R 25/02126; B60R 25/02105; B60R 25/02134; B60R 25/02147; B60R 25/02153
USPC ..................... 70/182–186, 252, 253
See application file for complete search history.

(56) References Cited

U.S. PATENT DOCUMENTS

| 3,566,635 | A | * | 3/1971 | Wolter | 70/252 |
| 3,748,877 | A | * | 7/1973 | Wolter | 70/186 |
| 3,859,828 | A | * | 1/1975 | Ibuka et al. | 70/252 |
| 3,959,996 | A | * | 6/1976 | Thirion | 70/186 |
| 4,400,954 | A | * | 8/1983 | Nakamoto et al. | 70/186 |

(Continued)

FOREIGN PATENT DOCUMENTS

| EP | 0 669 234 A1 | 8/1995 |
| EP | 0 989 038 A1 | 3/2000 |

(Continued)

OTHER PUBLICATIONS

International Search Report issued in PCT/EP2010/066410, dated Jan. 21, 2011, with translation, 5 pages.

(Continued)

*Primary Examiner* — Suzanne Barrett
(74) *Attorney, Agent, or Firm* — Osha Liang LLP

(57) ABSTRACT

The invention relates to an antitheft device (2) for the steering column of a vehicle, comprising: a locking portion (6) including a bolt for locking the steering column, and a mobile member (22) capable of controlling the locking-in-position of the bolt; and an access portion (4) including a latch and carrying a pivoting rocker arm (34) bearing against the mobile member (22) and against the locking portion (6).

10 Claims, 1 Drawing Sheet

(56) References Cited

U.S. PATENT DOCUMENTS

| | | | |
|---|---|---|---|
| 4,466,262 A * | 8/1984 | Maiocco et al. | 70/252 |
| 4,487,042 A * | 12/1984 | Mochida et al. | 70/186 |
| 4,771,619 A * | 9/1988 | Shiramizu et al. | 70/186 |
| 4,905,487 A * | 3/1990 | Morikawa et al. | 70/186 |
| 4,972,692 A * | 11/1990 | Morikawa et al. | 70/186 |
| 5,036,686 A * | 8/1991 | Ichinose | 70/186 |
| 5,632,167 A * | 5/1997 | Kawachi et al. | 70/186 |
| 6,260,651 B1 * | 7/2001 | Kokubu et al. | 180/287 |
| 6,327,882 B1 * | 12/2001 | Canard | 70/186 |
| 6,442,985 B1 * | 9/2002 | Watanuki et al. | 70/186 |
| 6,718,805 B2 * | 4/2004 | Okuno | 70/186 |
| 6,810,701 B2 * | 11/2004 | Lee et al. | 70/186 |
| 6,941,779 B2 * | 9/2005 | Shigeyama et al. | 70/186 |
| 7,121,126 B2 * | 10/2006 | Zillmann | 70/186 |
| 7,363,787 B2 * | 4/2008 | Yukihara et al. | 70/252 |
| 8,001,814 B2 * | 8/2011 | Okada et al. | 70/186 |
| 8,033,148 B2 * | 10/2011 | Okada et al. | 70/186 |
| 8,234,895 B2 * | 8/2012 | Nakamoto et al. | 70/252 |
| 8,499,596 B2 * | 8/2013 | Maltaverne et al. | 70/186 |
| 8,689,593 B2 * | 4/2014 | Giacomin | 70/187 |
| 2004/0107749 A1 * | 6/2004 | Yukihara et al. | 70/186 |
| 2004/0148983 A1 * | 8/2004 | Suzuki et al. | 70/186 |
| 2005/0034493 A1 * | 2/2005 | Wittwer et al. | 70/186 |
| 2006/0021402 A1 * | 2/2006 | Kai | 70/252 |
| 2006/0070414 A1 * | 4/2006 | Limburg et al. | 70/186 |
| 2009/0064739 A1 * | 3/2009 | Trischberger et al. | 70/237 |

FOREIGN PATENT DOCUMENTS

| | | |
|---|---|---|
| FR | 2 909 951 A1 | 6/2008 |
| GB | 2 063 985 A | 6/1981 |
| WO | 2008/074726 A1 | 6/2008 |

OTHER PUBLICATIONS

Written Opinion issued in PCT/EP2010/066410, dated Jan. 21, 2011, 5 pages.

* cited by examiner

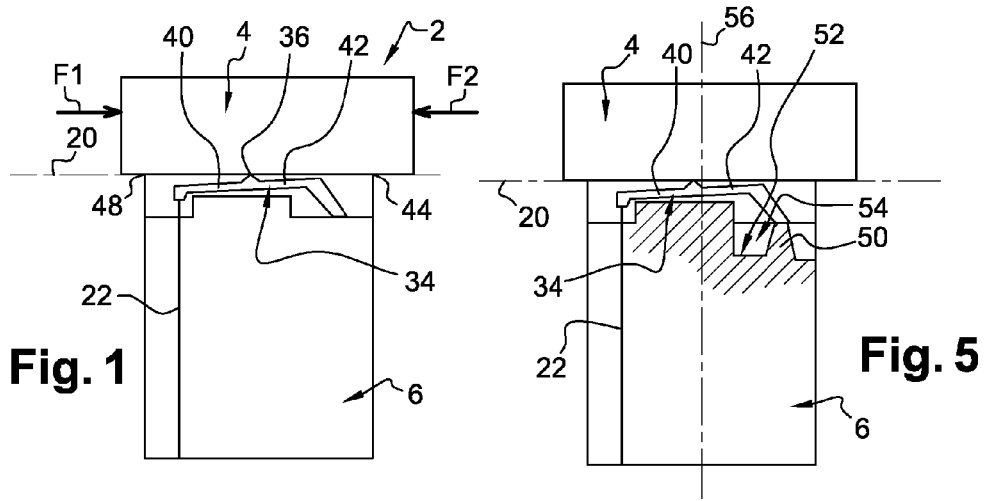
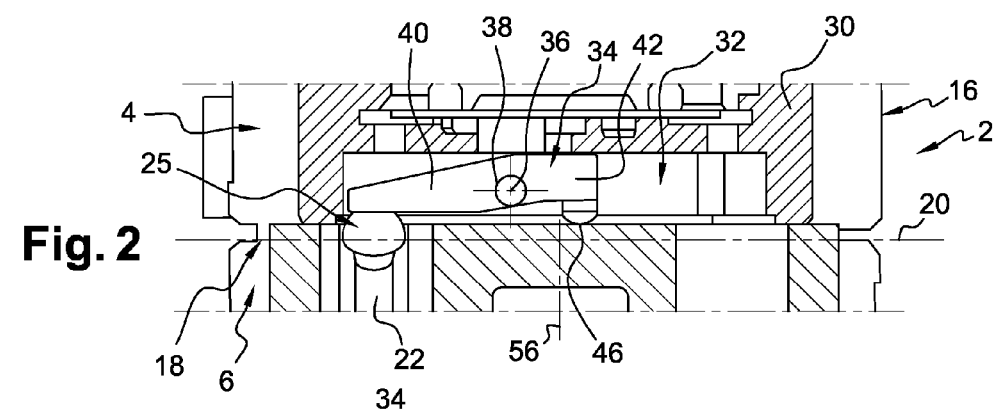
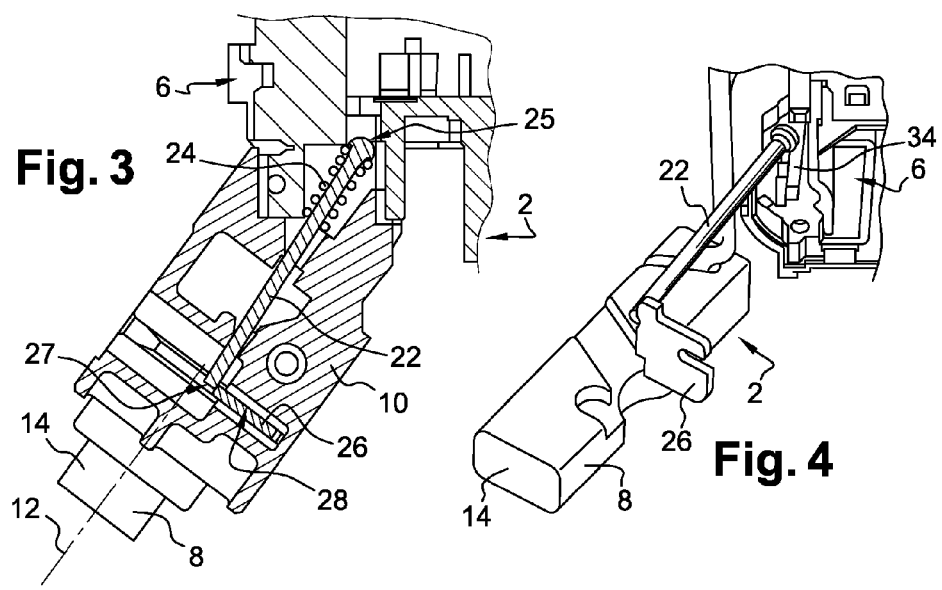

ANTITHEFT DEVICE FOR THE STEERING COLUMN OF A VEHICLE HAVING SUPER-LOCKOUT PROVIDED BY A ROCKER ARM

The invention relates to antitheft devices for the steering column of a vehicle.

The function of these devices, which generally comprise the latch of the ignition key of the vehicle, is to lock the movement of the column when this movement is not authorized, in particular when the ignition key of the vehicle is absent.

In addition, they are frequently equipped with a function known as super-lockout with the aim of maintaining locking of the column even if a criminal has broken the part of the device carrying the latch.

Furthermore, these devices must conform to the standards and the regulations in force concerning impact by the driver's knee, which require the antitheft device to rupture under the effect of a predetermined impact against the driver's knee and to do this without causing serious injury to the latter. It is for this reason that the device is generally provided with a weakened zone allowing it to rupture under the effect of a reduced force. Under these conditions, an effort is made to ensure that, if a criminal exerts a similar force, rupture takes place without jeopardizing the super-lockout function. However, the criminal may contemplate exerting the same force, but in a different direction from that which corresponds to the impact by the knee. In this case, however, there are considerable risks that the super-lockout will not function.

In fact, this function is triggered by a moving rod influenced by a spring acting against the part of the device carrying the latch. If the force exerted on the device causing it to rupture is applied on the same side of the device as that on which the rod is situated, the ensuing rupture will liberate a large space for the displacement of the rod, such that the super-lockout takes place. If, however, the force is exerted on the opposite side to that on which the rod is situated, it is possible for the rupture to occur without creating a sufficiently large space to permit movement of the rod in order to trigger the super-lockout function.

One object of the invention is to facilitate triggering of the super-lockout function regardless of the point of application of the rupture force and its direction of application.

Proposed for this purpose according to the invention is an antitheft device for the steering column of a vehicle, which comprises:
- a locking part comprising a bolt for locking the steering column and a mobile member capable of controlling the locking-in-position of the bolt; and
- an access part comprising a latch and carrying a pivoting rocker arm bearing against the mobile member on the one hand and against the locking part on the other hand.

Thus, if the force is exerted on the side of the mobile member, the liberated space permits, as previously, the displacement of this member and the triggering of the super-lockout function. If the force is exerted on the opposite side, the rocker arm offers a longer displacement stroke to the mobile member in order to benefit this triggering.

The device according to the invention can also exhibit at least one or other of the following characteristics:
- the rocker arm bears against the mobile member and the locking part in one and the same direction;
- the rocker arm bears against the mobile member and the locking part to either side of the pivot respectively;
- the mobile member is mounted in a sliding manner;
- the locking part exhibits a cavity adjacent to a bearing zone for the rocker arm on the locking part and extending towards the rocker arm;
- the locking part exhibits a cavity adjacent to a bearing zone for the rocker arm on the locking part and extending on one side of the bearing zone opposite the rocker arm;
- the locking part exhibits a cavity surrounding a bearing zone for the rocker arm on the locking part and extending towards the rocker arm;
- the rocker arm comprises an arm bearing against the mobile member and an arm bearing against the locking part and shorter in length than the other arm; and
- the mobile member exhibits an extremity having a spherical face in contact with the rocker arm.

Depending on the circumstances of the rupture, the different cavities proposed above permit an increase in the angular displacement of the rocker arm and accordingly that of the mobile member in order to further benefit the triggering of the super-lockout function.

Also proposed according to the invention is a vehicle comprising a device according to the invention.

Other characteristics and advantages of the invention will become clear in the following description of an embodiment and of a variant provided by way of non-exhaustive examples with reference to the accompanying drawings, in which:

FIG. 1 is a schematic view of the device according to an embodiment of the invention illustrating its operating principle;

FIG. 2 is a partial view in longitudinal section of the device depicted in FIG. 1;

FIG. 3 is a view in longitudinal section of another part of the same device;

FIG. 4 is a view in perspective of certain components of the device; and

FIG. 5 is a view similar to FIG. 1 illustrating a variant embodiment.

Illustrated in FIGS. 1 to 4 is an embodiment of the antitheft device according to the invention for the steering column of a motor vehicle. This device 2 in this case comprises two principal parts, which we will refer to here as the access part 4 and the locking part 6 respectively. The access part 4 comprises in particular a key-operated latch or a similar device. When the driver of the vehicle introduces the key into the latch, he is able to cause a rotor in the latter to rotate in order to switch on the power to the vehicle and to put it in operation.

The locking part 6 comprises in particular a bolt 8, visible in FIG. 4, having the general form of a rectangular parallelepiped. It is mounted in a sliding manner in a bolt guide 10 in the part 6. Sliding takes place in a longitudinal direction 12 of the bolt. The bolt, when it is in an extended position, moves by means of its distal extremity 14 into engagement with a member on the steering column of the vehicle in order to lock the rotation of the latter about its axis of rotation.

The operation of the latch by means of the key permits the position of the bolt, and accordingly the locking or unlocking of the steering column, to be controlled. Further details about this subject can be obtained in particular by reference to application WO 2008/074726 in the name of the applicant.

The device 2 comprises a body 16 exhibiting, at a junction between the access part 4 and the locking part 6, a weakened zone or a rupture zone 18 constituted by a local thinning in the thickness of the wall of the body 16. This zone is positioned in such a way that, if a force is exerted on the access part 4, it may cause the rupture of the body 16 and of the device by separation of the access part 4 and the locking part 6 according to a plane 20 illustrated in FIG. 2 passing through the weakened zone and perpendicular to the principal axis of symmetry 56 of the access part 4.

The locking part 6 comprises a mobile member 22, in this case in the form of a slide such as a pin 22 or a needle. The pin 22 has the general form of a rigid rectilinear rod extending in this case in parallel to the direction 12, which direction is inclined in relation to the axis 56. The pin 22 is mounted in a sliding manner in the body 16, as can be appreciated from the sectional view in FIG. 3.

The locking part 6 comprises a spring 24 working in compression and bearing with one extremity against a shoulder on the proximal extremity 25 of the pin 22 and with its other extremity against the body in order to cause the pin to move in one direction with the intention of bringing it closer to the access part 4 and of distancing it from the bolt 8.

The locking part comprises a plate 26 mounted in a movable manner in a conduit 28 and maintained in position at one extremity of this conduit by the distal extremity 27 of the pin 22. The device is arranged in such a way that, if the pin 22 is caused by the spring to move in the direction of the access part 4 and in the opposite direction from the bolt, it releases the plate 26, thereby locking the bolt 8 in position, which bolt then itself immobilizes the steering column.

The access part 4 comprises a stator 30 exhibiting a housing 32 at its lower extremity open towards the bottom. This housing 32 receives a rocker arm or lever 34 mounted in such a way as to be free to pivot in relation to the stator 30 about an axis 36 constituted by a shaft 38. The axis 36 is orthogonal to the principal axis of symmetry 56 of the access part 4. The rocker arm 34 comprises two opposing arms 40, 42 extending to either side of the pivot. The extremity of the arm 40 bears against a spherically formed face of the proximal extremity 25 of the pin 22. The other arm 42 bears against the frame of the locking part 6. These two supports take place in the same direction and specifically in this instance according to the axis 56 and in the direction of the locking part. In this case, the arm 40 is longer than the arm 42 so that the distance separating the point of support of the arm 40 and the axis 36 is greater than that which separates the point of support of the arm 42 and this same axis. Furthermore, the axis 36 is offset in such a way that it does not pass via the axis 56, the latter extending to the right of the arm 42.

The device 2 functions in the following manner. It is assumed here that the steering column is locked by the bolt 8. With reference to FIG. 1, a criminal exerts a force F1 on the access part 4 in a direction essentially parallel to the plane 20. This force is thus applied from the side of the device which comprises the pin 22 and from the side closest to the arm 40. Under the effect of this force, the weakened zone 18 ruptures over its greatest extent according to the plane 20, thereby permitting rotation of the access part 4 in relation to the locking part 6 about an axis of rotation passing through a point 44 indicated in FIG. 1 and situated on the edge of the locking part. The access part 4 thus pivots in a clockwise direction in FIG. 1. The rocker arm executes a rotation in the same direction about the point of support 46 of the arm 42 on the frame. The arm 40 moves away rapidly and to a great distance from the pin 22, thereby offering the latter the possibility of considerable displacement. Under the influence of the spring 24, the pin is thus caused to move thereby liberating the plate 26, which in turn immobilizes the bolt 8 in position, thereby producing the super-lockout.

Let us now assume that the exerted force is a force F2, on this occasion having as its point of application the side of the access part opposite the pin, the side closest to the arm 42, the force once again being exerted parallel to the plane 20. On this occasion, the rupture of the weakened zone 18 causes rotation of the access part 4 in an anticlockwise direction about an axis of rotation passing through a point 48 illustrated in FIG. 1, at the edge of the locking part. The axis also executes a rotation in the same direction, which permits the rocker arm 34, still under the influence of the pin 22, to exhibit a rotational movement in relation to the access part 4 in a clockwise direction. This latter movement of the rocker arm, which is made up of two rotational movements if the locking part 6 is taken as the reference, once again liberates a large space in the trajectory of the pin 22, which, under the influence of the spring, is capable of sliding, as previously, in order to liberate the plate 26 and to permit the locking in position of the bolt 8. It should be noted that the axis 36 in this case still moves at a relatively high speed, which facilitates the rapid activation of the device. In this latter case, in spite of the force being exerted on the side opposite that which carries the pin 22, the latter is able to be deployed rapidly in order to permit superlockout.

Significant displacement of the activation pin is thus achieved, regardless of the direction of the force exerted with the intention of rupturing the device. The invention does not require a change to the positioning of the pin in relation to that which is already familiar from the prior art.

Illustrated in FIG. 5 is a variant embodiment of the device. The majority of the component parts are unchanged in relation to the embodiment described previously. The only difference resides in the fact that the point of support of the locking part for the arm 42 on this occasion has the form of a projecting small island or nipple 50 extending from a face 52 of the frame of the locking part. In this case, the latter exhibits a cavity 54 surrounding the relief 50 for one complete turn and extending in particular with regard to the arm 34.

With this arrangement, the device is rendered significantly more sensitive to the displacement of the access part 4 in relation to the locking part in the event of rupture. In fact, if the effect of the force F1 is to cause displacement of the access part 4 in translation towards the right in relation to the locking part 6, the arm 34 will fall into the cavity while being pushed to the right with the access part 4, the effect of which is to cause the rocker arm to pivot in spite of the simple sliding movement experienced by the access part 4. The pin will thus be able to liberate the plate. Conversely, if the translation is a translation in the opposite direction under the effect of a force F2, the arm 42 will once again fall into the cavity, on this occasion on the left-hand side of the nipple 50, thereby permitting the rotation of the rocker arm in a clockwise direction and accordingly the displacement of the pin. Rotation of the rocker arm will similarly take place if the force required for rupture is exerted in such a way as to cause the access part 4 to rotate in relation to the locking part 6 about the principal axis 56. Depending on the direction of rotation, the arm 42 will fall to either side of the nipple, ahead of or behind the plane indicated in FIG. 5, once again permitting rotation of the rocker arm and liberation of the pin. It will thus be appreciated that this variant of the device bestows it with greater sensitivity to different types of movement and to a combination of these movements.

Of course, numerous modifications can be brought to the invention without departing from the context of the invention.

A cavity to either side of the point of support of the arm 42 may be proposed without this being a cavity surrounding a relief forming this point of support.

The invention claimed is:

1. An antitheft device for a steering column of a motor vehicle, comprising:

a body comprising a locking part, an access part, and a weakened zone disposed at a junction between the locking part and the access part,
wherein the weakened zone is configured to rupture from a predetermined force;
a bolt coupled to the steering column;
a mobile member coupled to the bolt and the locking part;
a pivoting rocker arm bearing against the mobile member and the locking part; and
a latch coupled to the access part,
wherein, when the weakened zone is ruptured, the mobile member is configured to immobilize the bolt, thereby locking the steering column in a locked position.

2. The device as claimed in claim 1, wherein the pivoting rocker arm bears against the mobile member and the locking part in a same direction.

3. The device as claimed in claim 1, wherein the pivoting rocker arm bears against the mobile member and the locking part to either side of a pivot of the pivoting rocker arm.

4. The device as claimed in claim 1, wherein the mobile member is mounted in a sliding manner.

5. The device as claimed in claim 1, wherein the locking part includes a cavity adjacent to a bearing zone for the pivoting rocker arm on the locking part, and wherein the cavity extends towards the pivoting rocker arm from the bearing zone.

6. The device as claimed in claim 1, wherein the locking part includes a cavity adjacent to a bearing zone for the pivoting rocker arm on the locking part, and wherein the cavity extends from the bearing zone on one side of the bearing zone opposite the pivoting rocker arm.

7. The device as claimed in claim 1, wherein the locking part includes a cavity surrounding a bearing zone for the pivoting rocker arm on the locking part, and wherein the cavity extends towards the pivoting rocker arm from the bearing zone.

8. The device as claimed in claim 1, wherein the pivoting rocker arm comprises a first arm bearing against the mobile member and a second arm bearing against the locking part, and wherein the second arm is shorter in length than the first arm.

9. The device as claimed in claim 1, wherein the mobile member includes an extremity coupled to a spherical face of the pivoting rocker arm.

10. A motor vehicle, comprising:
an antitheft device for a steering column of the vehicle, the device comprising:
a body comprising a locking part, an access part, and a weakened zone disposed at a junction between the locking part and the access part, wherein the weakened zone is configured to rupture from a predetermined force;
a bolt coupled to the steering column;
a mobile member coupled to the bolt and the locking part;
a pivoting rocker ann bearing against the mobile member and the locking part; and
a latch coupled to the access part,
wherein, when the weakened zone is ruptured, the mobile member is configured to immobilize the bolt, thereby locking the steering column in a locked position.

* * * * *